3,383,396
PREPARATION OF SURFACE-ACTIVE AGENTS
USING A DISSOLVED ZIRCONIUM CATALYST
Arno Cahn, Pearl River, N.Y., and Henry Lemaire,
Leonia, N.J., assignors to Lever Brothers Company,
New York, N.Y., a corporation of Maine
No Drawing. Filed Oct. 30, 1963, Ser. No. 319,987
10 Claims. (Cl. 260—400)

The present invention relates to the preparation of surface active agents. More particularly, it relates to the preparation of surface active agents of the general formula

RCOOR'SO$_3$M where R is a mono-valent hydrocarbon radical having from 7 to 19 carbon atoms, R' is selected from the group consisting of di-valent hydrocarbon radicals containing from 2 to 4 carbon atoms and di-valent aryl and alkylaryl radicals containing from 6 to 8 carbon atoms, and M is an alkali metal, the surface active agents being prepared by the direct esterification of an alcohol of the formula HOR'SO$_3$M with an organic acid of the formula RCOOH.

The conventional direct esterification method suffers from certain disadvantages. An important disadvantage is that the reaction will not go to completion, the yields normally being less than 90% of the theoretical. Further, the high temperatures and long reaction times required are uneconomical and can cause discoloration of the product.

It has now been found that the above reaction may be carried out more easily, quickly, and in higher yield by heating the reactants in the presence of soluble zirconium and zirconyl salts of strong acids or zirconium or zirconyl soaps of aliphatic hydrocarbons having 8 to 18 carbon atoms. The disadvantages of the prior art methods are thereby overcome or reduced.

In carrying out this reaction, the organic acids which are suitable for the manufacture of surface active agents may be used. In general, these are the acids of aliphatic hydrocarbons having from 8 to 20 carbon atoms. Such acids include the unsubstituted, saturated or unsaturated, straight-chain fatty acids, such as lauric acid, myristic acid, palmitic acid, stearic acid, oleic acid, acids derived from bone grease (a mixture of $C_{16-18}$ fatty acids), acids derived from palm kernel oil (a mixture of $C_{8-18}$ fatty acids), acids derived from coconut oil (a mixture of $C_{8-18}$ fatty acids), and acids derived from tallow (a mixture of saturated and unsaturated $C_{16-18}$ fatty acids). Synthetic acids such as those derived from the Oxo and Koch processes may also be used. Fatty acids of the foregoing type may be used pure or may be employed as mixtures.

As compounds of the formula HOR'SO$_3$M it is preferred to use those in which R' is a di-valent hydrocarbon radical containing 2 to 4 carbon atoms, particularly ethylene, methylethylene, dimethylethylene, propylene or butylene. R' may also be an aryl or alkylaryl group containing 6 to 8 carbon atoms. M is preferably an alkali metal, especially sodium or potassium. The preferred second reactant may be prepared by the reaction of an epoxide, for instance, ethylene oxide, propylene oxide or butylene oxide with sodium bisulfite. Examples of compounds suitable for use as a second reactant are sodium isethionate, potassium methylisethionate, sodium di-methyl isethionate and sodium 3-hydroxy propane-sulfonate.

The direct esterification reaction is carried out using an excess of the acid reactant, for example, at least about 1.2 moles of the acid per mole of the second reactant. An excess of the acid reactant assists in maintaining the product in liquid form during the reaction and also helps to reduce the formation of foam. Amounts of acid in excess of about 2 moles per mole may be used.

The products of the reaction of this invention are generally used as detergents, such as in the manufacture of detergent tablets or in the manufacture of detergent hand soap in bar form. The crude products of this reaction may be used without further treatment, or may be freed of excess unreacted acids before being used in finished detergent products. The excess acid may be either wholly or partially neutralized by the addition of bases or basic salts, particularly alkali metal hydroxides and carbonates such as sodium carbonate, sodium hydroxide, or potassium carbonate. In some instances it may be preferred to remove the excess acid reaction by distillation. In other instances it may be advantageous to replace the lower molecular weight excess fatty acid by a higher molecular weight acid (e.g. stearic) by distillation in the presence of the higher molecular weight acid.

Suitable zirconium or zirconyl salts are formed from the strong mineral acids, particularly sulfuric acid and the halo acids. Of the zirconium halides and zirconyl halides, the chlorides, bromides and iodides are particularly preferred. The fatty acid portion of suitable zirconium and zirconyl soaps have from 8 to 20 carbon atoms and are generally of the same description as the fatty acid reactants. Where the zirconium or zirconyl compound is added as a soap, it is preferred, although not necessary, to use the soap formed from the fatty acid reactant. Because of the interchange reactions occurring in the reaction mass, it is probable that the zirconium or zirconyl compound is present in the reaction mass predominantly in the form of the soap formed from the fatty acid reactant.

According to the present invention, the yields obtained in the above reaction are improved significantly by providing for the presence of soluble zirconium or zirconyl salts or zirconium or zirconyl soaps or mixtures thereof in the reaction mixture. The amount of zirconium compound is not important, as widely varying amounts may be satisfactorily used. In general, about 0.02% to about 5% (calculated as ZrO$_2$), of the zirconium compound is provided based on the weight of the reaction mixture, but greater or lesser amounts may be used. In the preferred embodiment of this invention, the zironcium compounds are present in an amount between about 0.05% and about 1% (calculated as ZrO$_2$).

The reaction should be carried out with stirring in order to assist in the homogenization of the reaction mixture. However, stirring of much less vigor is necessary when the above mentioned zirconium compounds are present in the reaction mixture.

Water present in the reaction mass resulting from the addition of one or both reactants in the form of an aqueous solution, or resulting as a by-product of the reaction, should be removed. If convenient, the reaction may be carried out under reduced pressure to remove water, particularly water formed during the reaction, but reduced pressure is not an essential feature of the process. A small portion of the acid reaction may be distilled off with the water, and allowance should be made for this when calculating the amount of acid reactant to be used.

The reaction is carried out at a temperature of about 200° to about 240° C. Because discoloration of the product tends to occur at these temperatures, although to a lesser extent than at higher temperatures, it is preferred that an inert gas such as nitrogen or carbon dioxide be bubbled through the reaction vessel at a rate sufficient to maintain an inert atmosphere. It has been found that providing a non-oxidizing atomsphere in the reaction vessel reduces color formation in the product to the greatest possible extent. In some cases, it may be desirable to bubble the inert gas through the reactants before they are introduced into the reaction vessel in order to deoxygenate them. A particularly white product is obtained by using nitrogen which contains less than about 100 p.p.m. of oxygen, or preferably less than about 10 p.p.m. of oxygen.

The process of the present reaction may be carried out as a batch process, i.e., with the reactants and the zirconium compound present initially in the reaction vessel, or it may be modified to form a continuous or semi-continuous process. The invention is illustrated by the following examples:

EXAMPLE 1

A mixture of 235 grams (1.1 mole) of coconut oil fatty acids, 118 grams (0.8 mole) of sodium isethionate, and 21 ml. of water (to simulate a slurry of isethionate typical of those encountered in commercial operations) was charged in a 1 liter reaction vessel and stirred. The vapor space of the reactor was provided with a nitrogen sweep in order to exclude air during the reaction, and one-half liter per minute of prepurified nitrogen, containing a minimum of 99.996% nitrogen and an average oxygen content of 8 p.p.m., was bubbled through the reaction mixture. Nitrogen leaving the reaction vessel passed first through a water condenser and second through a Dry Ice condenser to remove vapors generated by the reaction.

To provide a basis for comparison, the above reaction was carried out without the presence of any zirconium compound. The reactor was heated in an oil bath to a temperature of about 245° C., by which time all of the initial water had been evaporated. This temperature was then maintained until water was no longer evolved. The cessation of water evolution served as a convenient, though approximate, indication of the end of the reaction.

After cessation of water evolution, heating and stirring were continued for an additional ten minutes. If no additional water was collected, this time interval was not included in the reaction time reported, the reaction time reported being the interval from the end of evolution of the initial water until water evolution ceased.

A sample of the melt was taken at this point. 65 grams of Emersol 132 (a mixture of 45% stearic acid and 55% palmitic acid) were added and the excess coconut fatty acids distilled off at a pressure of approximately 2–4 mm. Hg. The weight of the residue was determined, and a sample taken for a Hyamine titration (described in "ASTM Standards, Part X," 1961, pages 1099–1101, using di-isobutylphenoxyethoxyethyl, di-methyl benzyl ammonium chloride di-hydrate). From this data the amount of isethionate ester produced is calculated. The percent of theoretical yield was determined on the basis of the theoretically possible 0.8 mole. The results of four control runs are set forth in Table I.

TABLE I.—REACTION YIELD WITHOUT THE PRESENCE OF ZIRCONIUM

| Time (Minutes) | Temperature, (°C.) | Conversion (Percent) |
| --- | --- | --- |
| 120 | 240–246 | 89 |
| 100 | 241–248 | 89 |
| 120 | 244–254 | 88 |
| 130 | 242–251 | 87 |

EXAMPLE 2

A second group of control runs were made at lower temperatures following otherwise the procedure of Example 1. The reaction is very much slower in the absence of catalyst, as illustrated by the data in Table II. The temperature of about 230° C., and the time permitted for reaction, about 90 minutes, in these control runs are typical of the reaction conditions prevailing when the reaction is carried out in the presence of zirconium compounds in accordance with the present invention. Accordingly, the yields set forth in Table II may be directly compared with the yields given in subsequent examples to show the effect of the zirconium compound.

TABLE II.—REACTION YIELD WITHOUT THE PRESENCE OF ZIRCONIUM

| Time (Minutes) | Temperature, (°C.) | Conversion (Percent) |
| --- | --- | --- |
| 90 | 231–234 | 31 |
| 90 | 229–232 | 32 |

EXAMPLE 3

The procedure of Example 1 was repeated using various zirconium compounds to catalyze the reaction. Where acidic zirconium compounds are used, i.e. $ZrSO_4 \cdot H_2O$ or $ZrOCl_2$, the 21 ml. of water added with the sodium isethionate is first driven off by boiling before the catalyst is added. The results are set forth in Table III.

TABLE III.—REACTION YIELD IN THE PRESENCE OF ZIRCONIUM

| Catalyst | Weight Percent Catalyst | Reaction Time, min. | Reaction Temp. °C. | Percent Conversion |
| --- | --- | --- | --- | --- |
| $ZrSO_4 \cdot 4H_2O$ | 0.8 | 45 | 223 | 95 |
| Zr Soap [1] | 2.7 | 60 | 229 | 97 |
| $ZrOCl_2$ | 0.8 | 65 | 232 | 94 |
| Zr Soap [2] | 1.7 | 40 | 230 | 93 |

[1] Catalyst consisted of 3.74 g. $ZrSO_4 \cdot 4H_2O$ and 6 g. of sodium coconutate. It is assumed for calculational purposes that these components formed 0.0105 mole of zirconium tetracoconutate in situ.
[2] Catalyst consisted of 3.74 g. $ZrOCl_2$ + 6 g. of sodium coconutate. The formation of 0.012 mole of zirconyl dicoconutate was assumed.

In the practice of this invention, widely varying amounts of catalyst may be used as discussed above.

Zirconium soap may be added as a catalyst directly, or it may be formed in situ by the simultaneous addition of a zirconium or zirconyl salt and sodium soap to the reaction mass as shown in the foregoing examples.

In the practice of this invention, it is preferred that the fatty acid be present in a ratio of at least 1.2 moles per mole of hydroxy-sulfonic acid. In the preceding examples the apparent mole ratio in each case was 1.375. However, where a catalyst such as zirconium sulfate or zirconyl chloride is used, a portion of the zirconium may be expected to saponify with the free fatty acids present, so that the effective ratio of the fatty acid to the hydroxy-sulfonate will be somewhat lower. In each case, however, the effective ratio should be at least 1.2.

While the invention as set forth above is not to be limited by any theory, the following explanation may be helpful in understanding the nature of the new process. The direct esterification of the hydroxy-sulfonic acid is known to be a difficult reaction. The presence of the sulfonic acid group is believed to affect adversely the reactivity of the hydroxyl group. Accordingly, when it is desired to carry out a direct esterification reaction, a reaction temperature of 240° to 250° C. is necessary, and a relatively long reaction time is required. Under these conditions, the yield of the desired ester product is significantly decreased. Because of this, it has heretofore been the preferred practice in the commercial production of fatty acid esters of isethionates to use the route of treating the isethionate with an acid chloride. While the acid chloride route introduces additional steps and corrosive materials, the better yield obtained by the acid chloride route outweighs these disadvantages.

In the process of the present invention, the zirconium salts and zirconium soaps are thought to act as catalysts. The catalytic activity of the various zirconium compounds with respect to the esterification of isethionates is illustrated by comparing Examples 1 and 2 with the data in Example 3. These data show that the esterification may be carried out at a temperature which averages about 15° C. lower, i.e., about 230° C., and that the reaction is substantially complete in a period of about an hour, while reaction times of approximately two hours are required when no catalyst is used.

Unexpectedly, it has been discovered that the catalytic activity of the zirconium compounds with respect to the desired esterification reaction is selective in its nature.

While the desired esterification reaction is catalyzed, the undesired side reactions are affected by the presence of a catalyst to a significantly lesser extent. Thus, providing for the presence of zirconium compounds in the direct esterification reaction not only materially improves the reaction conditions, i.e., permits the use of shorter reaction times and lower temperatures, but also provides a significant improvement in yield of the desired ester product. The process thereby provides a novel method of obtaining esters of hydroxy-sulfonic acids which is competitive with the more conventional acid chloride route, and at the same time, is more economical.

It is particularly preferred to use zirconium and zirconyl soaps in the practice of this invention. An important advantage in the use of zirconium and zirconyl soaps is that the soaps are substantially non-corrosive. This provides still another improvement over the conventional processes employing the acid chloride synthesis route. The acid chloride process is characterized by the presence of large amounts of acid chlorides and by-product hydrochloric acid, both of which are highly corrosive. Similarly, the reaction mass is moderately corrosive where the esterification reaction is catalyzed by the presence of strong acids or salts of weak bases and strong acids such as zirconium sulfate or zirconyl chloride (although to a lesser extent than when the acid chloride synthesis is used). Such processes are disadvantageous because the use of glass-lined equipment is required.

Where zirconium soaps, according to the present invention are used, equipment limitations, vis-a-vis corrosion, are imposed only to the extent that special materials of construction are required to handle the fatty acids. The fatty acids themselves are substantially less corrosive, and therefore stainless steel equipment has been found to be quite satisfactory for carrying out the reaction where zirconium soaps are used as catalysts.

It will be understood that the foregoing examples and explanation are for illustrative purposes only, and that the present invention includes numerous modifications which will be self-evident to those skilled in the art. Accordingly, the invention is not to be limited save as is consonant with the following claims.

We claim:
1. A process for preparing a compound of the formula RCOOR'$SO_3$M, wherein R is an aliphatic hydrocarbon having from 7 to 19 carbon atoms, R' is selected from the group consisting of acyclic di-valent hydrocarbon radicals containing from 2 to 4 carbon atoms and di-valent aryl and alkylaryl hydrocarbon radicals having from 6 to 8 carbon atoms, and M is an alkali metal, the process comprising heating an acid of the formula

RCOOH with a compound of the formula HOR'$SO_3$M in the presence of a zirconium compound selected from the group consisting of zirconium and zirconyl salts of strong mineral acids and zirconium and zirconyl soaps of acids of aliphatic hydrocarbons having from 8 to 20 carbon atoms, and at a temperature of about 200° to 240° C., the ratio of RCOOH to HOR'$SO_3$M being at least about 1.2 moles per mole.

2. A process according to claim 1 wherein said zirconium compound is present in an amount from about 0.05% to about 5%, calculated as $ZrO_2$ based on the weight of the reaction mixture.

3. A process according to claim 1 wherein said zirconium compound is present in an amount from about 0.1% to about 1.0% calculated as $ZrO_2$ based on the weight of the reaction mixture.

4. A process for preparing a compound of the formula RCOOR'$SO_3$M, wherein R is an aliphatic hydrocarbon having from 7 to 19 carbon atoms, R' is selected from the group consisting of acyclic di-valent hydrocarbon radicals containing from 2 to 4 carbon atoms and di-valent aryl and alkylaryl hydrocarbon radicals containing from 6 to 8 carbon atoms and M is an alkali metal, the process comprising heating an acid of the formula RCOOH with a compound of the formula HOR'$SO_3$M in the presence of a zirconium compound selected from the group consisting of zirconium halides, zirconyl halides, zirconium sulfate and zirconyl sulfate, at a temperature of about 200° to about 240° C., the ratio of RCOOH to HOR'$SO_3$M being at least about 1.2 moles per mole.

5. A method according to claim 4 wherein R' is selected from the group consisting of —$CH_2$—$CH_2$—, —CH($CH_3$)—$CH_2$—, —CH($CH_3$)—CH($CH_3$)—, and —($CH_2$)$_3$—.

6. A process for preparing a compound of the formula RCOOR'$SO_3$M, wherein R is an aliphatic hydrocarbon having from 7 to 19 carbon atoms, R' is selected from the group consisting of acyclic di-valent hydrocarbon radicals containing from 2 to 4 carbon atoms, and di-valent aryl and alkylaryl hydrocarbon radicals containing from 6 to 8 carbon atoms and M is an alkali metal, the process comprising heating an acid of the formula RCOOH with a compound of the formula, HOR'$SO_3$M in the presence of a zirconium compound selected from the group consisting of zirconium and zirconyl soaps of an acid of an aliphatic hydrocarbon having from 8 to 20 carbons atoms at a temperature of about 200° C. to 240° C., the ratio of RCOOH to HOR'$SO_3$M being at least about 1.2 moles per mole.

7. A method according to claim 5 wherein R' is selected from the group consisting of —$CH_2$—$CH_2$—, —CH($CH_3$)—$CH_2$—, —CH($CH_3$)—CH($CH_3$)—, and —($CH_2$)$_3$—.

8. A process for preparing a compound of the formula RCOOR'$SO_3$Na, wherein R is an aliphatic hydrocarbon radical having from 7 to 19 carbon atoms and R' is selected from the group consisting of acyclic di-valent hydrocarbon radicals containing from 2 to 4 carbon atoms and di-valent aryl and alkylaryl hydrocarbon radicals having from 6 to 8 carbon atoms, comprising heating an acid of the formula RCOOH with a compound of the formula HOR'$SO_3$Na in the presence of a zirconium compound selected from the group consisting of zirconium and zirconyl salts of strong mineral acids, and zirconium and zirconyl soaps of organic acids of aliphatic hydrocarbons having from 8 to 20 carbon atoms, at a temperature of about 200° to about 240° C., the ratio of RCOOH to HOR'$SO_3$Na being at least about 1.2 moles per mole.

9. A method according to claim 6 wherein R' is the ethylene radical.

10. A method according to claim 6 wherein the reactants are heated until water is no longer evolved in the reaction mixture.

References Cited

Sabatier, Catalysis in Organic Chemistry, 1923, D. Van Nostrand Company, New York, N.Y., page 278, section 772.

NICHOLAS S. RIZZO, *Primary Examiner.*

C. B. PARKER, *Examiner.*

A. H. SUTTO, J. H. TURNIPSEED,
*Assistant Examiners.*